July 15, 1947.  C. OTTO  2,424,206

PRODUCTION OF AMMONIUM SULPHATE

Filed June 25, 1943  2 Sheets-Sheet 1

INVENTOR
CARL OTTO
BY
John E. Hubbell
ATTORNEY

July 15, 1947.   C. OTTO   2,424,206
PRODUCTION OF AMMONIUM SULPHATE
Filed June 25, 1943   2 Sheets-Sheet 2

INVENTOR
CARL OTTO
BY
John E. Hubbell
ATTORNEY

Patented July 15, 1947

2,424,206

UNITED STATES PATENT OFFICE 2,424,206

PRODUCTION OF AMMONIUM SULPHATE

Carl Otto, Manhasset, N. Y., assignor to Fuel Refining Corporation, New York, N. Y., a corporation of Delaware Application June 25, 1943, Serial No. 492,265

3 Claims. (Cl. 23—119)

The general object of the present invention is to provide an improved method of and improved apparatus for converting the ammonia content of distillation gas, and particularly of coke gas, into ammonia sulphate by passing the gas into a so-called saturator containing a bath of weak sulphuric acid with which the gas is brought into scrubbing contact so that the ammonia elements in the gas and the sulphuric acid elements in the bath combine to form sulphate of ammonia which subsequently crystallizes out of the solution.

The invention relates particularly to the construction and operation of a saturator which is of greater capacity than has been heretofore customary, and which is adapted for use in the production of relatively large sulphate of ammonia crystals, though features of the invention are well adapted for use in saturators of smaller size and in the production of sulphate crystals which are not relatively large.

Heretofore, very little of the substantial amount of sulphate of ammonia produced in this country by passing coke oven gas through saturators, has been in the form of large crystals. However, the term "large," as used herein, is well established in the art and indicates crystals of an average size and weight several times that of the finer crystals heretofore customarily produced. For example, the term "Grade I" ammonium sulphate crystals is a well known term of art applying to sulphate comprising crystals of which 40% are too large to pass a 35 mesh screen and only 5% are small enough to pass through a 70 mesh screen, whereas of the fine sulphate of ammonium crystals commonly produced in saturators, 80% or more will pass through a 35 mesh screen and about 40% will pass through a 70 mesh screen.

In the production of sulphate of ammonia in the general manner described, the crystals formed are initially minute and become large crystals only as a result of crystal growth requiring movement of the crystals relative to the "mother liquor" or bath liquor, out of which the fine crystals crystallize and in which they grow. A small sulphate of ammonia crystal increases in size, or grows, because it forms a nucleus for the attachment of other sulphate of ammonia crystallizing out of the bath liquor. For such growth it is practically essential that the bath liquor be subjected to agitation or recirculation so that each small crystal may be continually moving out of immediate contact with bath liquor which lacks, and be moving into immediate contact with bath liquor which does not lack sulphate of ammonia available for immediate attachment to the growing crystal.

For the desired crystal growth necessary for the production of large sulphate of ammonia crystals, it is also practically essential that the acidity of the bath liquor should be lower than is necessary or customary in the production of fine crystals. Thus, for example, the acidity of the bath liquor commonly employed in the production of fine crystals is that corresponding to a bath liquor sulphuric acid content of 7 per cent or higher, whereas the acidity of the bath liquor employed in the production of large crystals may well be that corresponding to a bath liquor acid content of 5.5 per cent or lower.

The low acidity of the bath liquor tends to troublesome deposits of sulphate of ammonia, commonly called "rocksalt" on exposed saturator surfaces above and within the bath, and the maintenance of conditions tending to minimize "rocksalt" deposits is practically important in the production of large sulphate of ammonia crystals. The relatively low acidity required for the production of large sulphate of ammonia crystals also increases the extent, and/or effectiveness of the scrubbing contact of the ammonia containing gas and bath liquor required to recover all the ammonia content of the gas.

The production of large sulphate of ammonia crystals in the manner contemplated herein is a continuous process and the bath liquor normally contains crystals which are in all stages of growth and size. The larger crystals tend to collect in the lower portion of the usual hopper bottom of the saturator, and in the arrangement shown, are withdrawn from the saturator in a carrying stream of bath liquor by a pump which may be a centrifugal pump, or a steam jet pump, and in either case has its inlet opening to the saturator adjacent the lower end of its hopper bottom portion.

A main object of the present invention is to provide a practical and effective method of and means for minimizing the fine crystal content of the crystals separated from the bath liquor by enveloping the crystals removed from the bath in a carrying stream of bath liquor which has a fine crystal content smaller than the average fine crystal content of the bath and which carries the crystals from the saturator to apparatus including a centrifuge in which the crystals are separated from the carrying stream liquor and dried. To this end, the carrying stream liquor is drawn in part only, or not at all, from the main body of bath liquor in the saturator, so that the movement of the crystals from the body portion of the bath to the crystal outlet at the bottom of the saturator may be wholly or largely due to gravity. In preferred forms of the invention, the carrying stream liquor consists wholly or largely of bath liquor previously withdrawn from the saturator and treated to reduce its crystal content while outside of the saturator.

By returning bath liquor to the bath as described, I make it practically feasible to withdraw large crystals from the saturator continuously instead of in the intermittent manner heretofore followed in the production of large sulphate of ammonia crystals.

A further and more specific object of the invention is to provide improved means for agitating the bath liquor and giving it the circulatory movements needed for the desired growth of smaller crystals into larger crystals. The means provided to effect such bath liquor agitation and circulation comprises means for compressing a portion of the gas passing through the saturator and injecting it into the bath liquor through a spray pipe after adding steam to the gas so as to avoid objectionable tarry deposits in said spray pipe.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
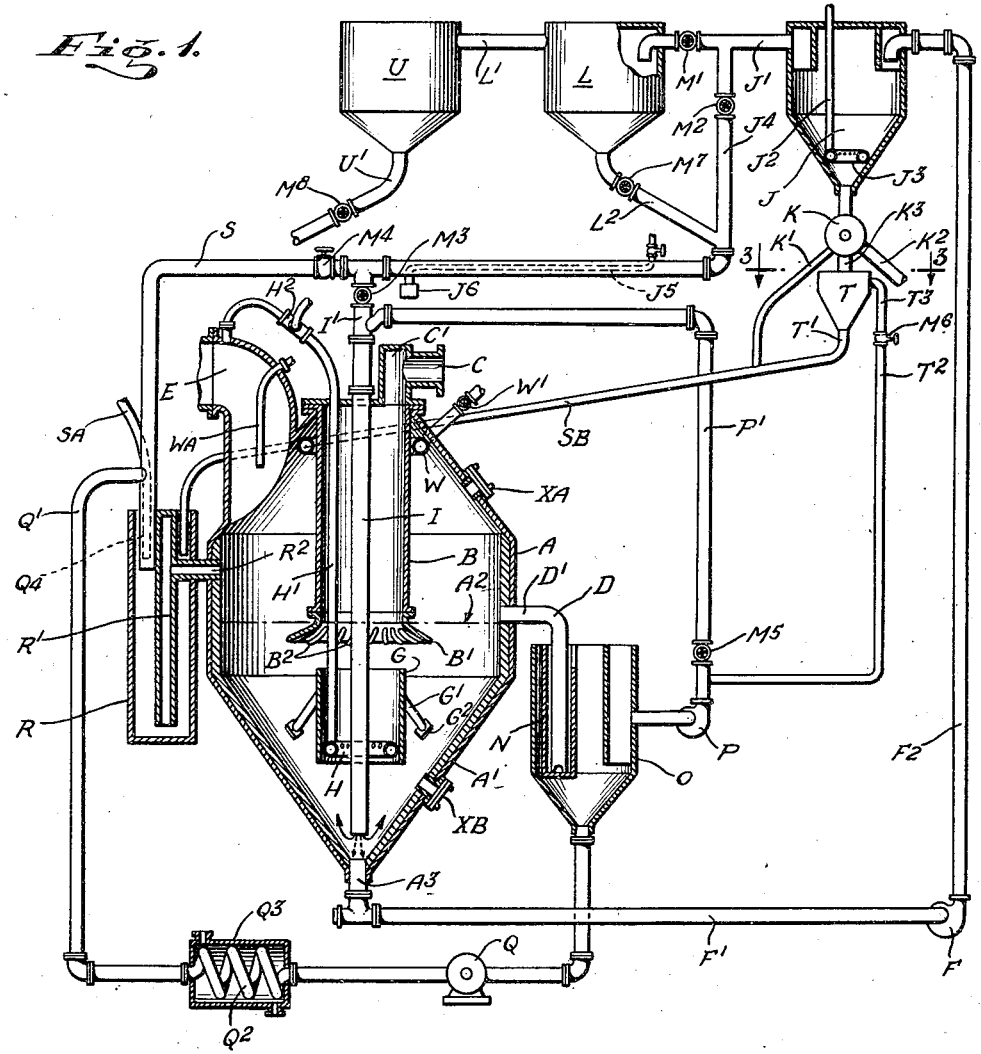
Fig. 1 is a somewhat diagrammatic view, partly in section, illustrating a preferred form of apparatus for use in the practice of my invention.

The apparatus shown in Fig. 1 of the drawings comprises a saturator tank A having a cylindrical body portion and a conical, or hopper bottom, portion A'. Coke oven gas is passed into the saturator through an axially disposed cracker pipe B, which receives gas at its upper end above the saturator through an inlet chamber C' from a gas main C. The cracker pipe B has a separately formed lower end section B' having an outwardly flared discharge mouth below the lever $A^2$ of the acid bath which fills the lower portion of the saturator and in which the discharge end B' of the cracker pipe is submerged. The mouthpiece B' is formed with ribs $B^2$ at its internal or under side which may be curved and disposed as are the ribs $B^2$ shown in Figs. 4 and 5. As shown in Fig. 1, the bath level $A^2$ is regulated by adjusting a weir D' in an overflow outlet D through which, in normal operation, bath liquor constantly outflows to remove from the saturator tar separating from the gas treated in the saturator. The gas which passes downward through the cracker pipe B into the bath and bubbles up through the latter, passes out of the saturator through an outlet connection E which leads away from the gas space of the saturator through a port in the conical top wall of the saturator. Sulphate crystals formed in the saturator and collecting in the lower end of its hopper bottom portion, are withdrawn along with bath liquor forming a carrying stream for the crystals by a suitable pumping device. In the form shown in Fig. 1 said device is a centrifugal pump F having its inlet F' connected to an outlet opening $A^3$ at the lower end, or apex, of the hopper bottom portion A' of the saturator.

For the production of desirably large ammonium sulphate crystals, it is important that the bath liquor be recirculated to subject the small crystals initially formed to a bath liquor scrubbing action by which those crystals are caused to grow. For the general purposes of the present invention, use may be made of bath liquor agitating and recirculating provisions comprising a motor driven pump propeller of known form. In the form of the invention illustrated in Fig. 1, however, bath liquor is agitated and recirculated by discharging upwardly directed jets of a compressed gaseous fluid into the lower end of the space surrounded by a vertically disposed open ended tubular member G. The member G is coaxial with, and has its upper end slightly below the cracker pipe end section B', and has leg portion G' through which the member is supported by and spaced away from the wall of the hopper bottom portion A' of the tank. As shown, said leg portions terminate in feet $G^2$ which bear against the conical wall of the bottom saturator tank portion A', but are not attached thereto so that the member G is readily removable for cleaning and repair purposes. Its use thus involves no risk of injuring the tank shell or its acid proof lining, such as would exist if the feet $G^2$ were rigidly connected to the tank shell, as by welding or "burning" them thereto.

The means shown in Fig. 1 for discharging a compressed gaseous fluid into the space surrounded by the member G comprises a hollow spray ring H within the lower portion of and coaxial with the member G and formed with outlet ports in its top wall, and receiving gas under pressure through the outlet pipe H' of a steam ejector $H^2$ which has its impelled fluid inlet $H^3$ connected to the saturator gas outlet E. It should be noted, however, that while there is ordinarily some advantage in using coke oven gas rather than air for saturator bath agitation and recirculation purposes, the amount of air required for the purpose is not great enough to significantly affect the composition of the gas passing away from the saturator through its outlets E. Agitation of the bath liquor is also affected by the gas flow along the channels between the cracker pipe ribs $B^2$, which sets up a circulatory movement about the cracker pipe axis of the bath liquor in the upper portion of the bath.

In the form of the invention shown in Fig. 1, the bath liquor agitation is augmented somewhat and the passage of undesirably small sulphate crystals to the outlet $A^3$ is minimized by the continuous flow of bath liquor through a pipe I into the portion of the saturator bath immediately adjacent the outlet $A^3$ through which the sulphate crystals passing to said outlet must pass. The pipe I extends downward through the top wall of the tank and axially downward through the cracker pipe B and through the member G, and has its lower discharge end well below the lower end of the member G and in suitably close proximity to the outlet $A^3$.

Ordinarily, the bath liquor passed into the lower portion of the bath for the purposes of the present invention, will be liquor which has passed out of the saturator through one or more of the outlets through which liquor customarily passes out of the saturator more or less continuously in normal operation. Thus in the arrangement shown in Fig. 1, the liquor passed into the saturator bath through the pipe I normally comprises the major portion of the crystal entraining stream of liquor withdrawn from the saturator through its outlet $A^3$, but may also comprise liquor which has passed out of the saturator through the overflow outlet D.

In the arrangement shown in Fig. 1, the liquid and crystal mixture withdrawn from the saturator by the pump F is delivered by the pump discharge pipe $F^2$ to a receptacle or tank J. The latter serves as a feed tank for a subjacent centrifugal separator K, and serves also as a treatment vessel in which crystals and bath liquor received from the saturator are agitated and recirculated in accordance with the present invention to reduce the amount of small crystals passing with the large crystals from the bottom of tank J into the subjacent centrifugal separator K. While some liquor passes with the crystals to the separator K, the major portion of the liquor entering the tank J passes away from the latter through the tank overflow outlet J'.

The mixture of liquor and crystals in the tank J is agitated and recirculated by means shown as comprising a pipe $J^2$ through which air or gas is supplied under suitable pressure to a horizontally disposed spray pipe ring $J^3$ provided with a multiplicity of small top outlets. The pipe ring $J^3$ is located in the lower hopper bottom portion of the tank J, and the jets of air discharged by the ring $J^3$ create circulatory movements including upflow and downflow components in the liquid and crystal mass in which the pipe ring is submerged.

In the normal mode of operation contemplated, liquor and crystals are continuously passed into the feed tank J from the saturator outlet $A^3$, and the crystals settling to the bottom of the tank J along with a small portion of the bath liquor entering that tank, are continuously discharged from the tank J to the centrifugal separator K, and the relatively great excess of the inflow through the pipe F' to the tank J over the outflow from the tank to the separator K, continuously passes away from the tank J through its overflow outlet J'. The liquid flowing away from the tank J through the pipe J' may all be returned to the saturator, though in some cases more or less of said liquor may be used for some other purpose as hereinafter described.

The air or gas jets discharged by the pipe ring $J^3$ agitate and recirculate the sulphate crystals and liquor in the tank J. The crystal circulation is especially great in the case of the finer crystals which are thereby given opportunity for significant growth or increase in size. The circulation also contributes to the entrainment of much of the fine crystal content in the liquor passing away from the tank J through its outlet J'. The circulation and agitating action of the air jets tends to increase the average size of the sulphate crystals passing from the tank J to the centrifugal separator K and to decrease the aggregate bulk and the average size of the fine crystals passing away from the tank J through its overflow outlet J'.

The bath liquor and fine crystals passing away from the tank J through its overflow outlet J', may pass into a saturator return pipe $J^4$, or into a settling tank L, or partly into said pipe and partly into said settling tank, depending upon the adjustment of valves M' and $M^2$, through which the outlet J' communicates with the pipe $J^4$ and tank L, respectively. As shown in Fig. 1, the pipe $J^4$ is connected by a valve $M^3$ to the upper end of the pipe I, and is connected through a valve $M^4$ to a pipe S through which liquor may be returned to the saturator under certain conditions as hereinafter described, without passing through the pipe I. In the contemplated normal use of the apparatus shown in Fig. 1 to produce large sulphate crystals, the valve $M^3$ is wide open and the valve $M^4$ is fully closed and all of the liquor passing through the pipe $J^4$ is discharged into the upper end of the pipe I.

In some cases means may advantageously be provided for heating the bath liquor passing through the pipe $J^4$ to thereby assist in maintaining the desired bath temperature of from 80 degrees F. to 120 degrees F., notwithstanding the saturator heat losses due to radiation, bath liquor evaporation and other causes. Such heating of the bath liquor is desirable also, because it prevents or greatly minimizes the crystallization of ammonia sulphate out of the bath liquor heated. Furthermore, a suitable increase in the temperature of the liquor returning to the saturator through the pipe $J^4$ dissolves a portion, at least, of the very fine crystals passing through the pipe to the saturator. This tends to a desirable decrease in the number, and a corresponding increase in the size, of the crystals in the final crystal product. As will be apparent, moreover, the reduction in the fine crystal content of liquor due to the heating of the liquor passing through the pipe $J^4$, is not confined to that liquor but extends also to the bath liquor which is returned through the pipe P' and is mixed in the pipe I with the bath liquor returned through the pipe $J^4$. As diagrammatically shown in Fig. 1, the liquor passing through the pipe $J^4$ is heated by means of a steam pipe $J^5$ located in and extending longitudinally of the pipe $J^4$ and provided with a trap $J^6$ for the discharge of condensate.

With the piping arrangement shown in Fig. 1, the liquor supplied to the pipe I may consist wholly of liquor leaving the saturator either through its bottom outlet $A^3$ or through its lateral outlet D, or it may comprise liquor leaving the saturator through each of those outlets. The lateral outlet pipe D comprises a downturned discharge end portion which extends downward into a seal pot N which is mounted in and overflows into a tar separator tank O. Tar carried out of the saturator through the outlet D and floating to the top of the body of liquor within the tank O, may be skimmed off or otherwise removed from the tank O which is customarily open at its upper end. Bath liquor from which tar has thus been separated is withdrawn from the tank O by one or the other or both of the two pumps P and Q.

The said pump P is shown in Fig. 1 as having its outlet pipe P' connected to a lateral branch portion I' of the pipe I. A throttling valve $M^5$ in the pump discharge pipe P' may be adjusted to regulate the amount of liquor passed into the pipe I from the tar separator tank O by the pump P.

The pump Q has its outlet Q' connected to the lower end of the hopper bottom portion of the tank O, and the liquor which it withdraws carries with it all of the sulphate crystals settling into the lower portion of said tank. With the pump Q operating to withdraw a substantial portion of the liquor entering the tank O through the saturator overflow outlet D, practically all of the larger crystals and much of the smaller crystals passing into the tank O will be drawn out of the latter by the pump Q. In consequence, the crystal content of the liquor withdrawn from the tank O by the pump P will be relatively small and will consist mainly of fine crystals. The liquor and crystals withdrawn from the tank O by the pump Q are returned to the saturator through an inflow pot R shown in Fig. 1. Advantageously, in many cases, the liquor returned to the saturator by the pump Q is heated prior to its delivery to the inflow pot R. To that end, as shown diagrammatically in Fig. 1, the pipe Q' may comprise a coil portion $Q^2$ passing through a steam chamber $Q^3$. The inflow pot R is vertically disposed alongside the saturator tank A with its upper and lower ends substantially above and below the normal tank liquid level $A^2$, respectively. A pipe R' vertically disposed in the tank R has a closed upper and an open lower end, and is provided intermediate its ends with a lateral outlet branch $R^2$ which extends through the wall of the saturator tank at a level somewhat above the bath level $A^2$. The tank R and pipe R' thus provide a liquid seal against gas outflow from the saturator through the pipe branch $R^2$. The discharge pipe Q' terminates in a downwardly extending discharge end $Q^4$ which extends downwardly into the liquid in the pot R.

Liquor passing through the pipe $J^4$ and diverted away from the pipe I by the adjustment of the valves $M^3$ and $M^4$, is discharged into the inflow pot R through the previously mentioned pipe S which has its lower end submerged in the liquid in the pot R. The inflow pot R is also operative to return to the saturator bath liquor received through pipes SA and SB from sources not previously mentioned herein.

The pipe SA is provided to return to the inflow pot liquor carried out of the saturator by entrainment in the gas leaving the saturator through its outlet E and separated from the gas in the usual acid catcher which is not shown and usually is of the cyclone liquid and gas separator type.

The pipe SB is employed to return to the saturator bath liquor separated from the liquor and crystal mixture passing from the feed tank J into the centrifugal separator K. The latter has a liquor outlet K' connected to the pipe SB, and is also provided with an outlet $K^2$ for dried crystals passing from the separator to storage, and an outlet $K^3$ for fine crystals screened out of the crystals passing to storage. As shown in Fig. 1, the outlet $K^3$ discharges into a device T in which the crystals are wetted and entrained in a bath liquor stream which passes into the pipe SB through the outlet T' from the device T. The bath liquor in said stream is supplied to the device T by the discharge pipe P' of the pump P through a branch $T^2$ connected to the liquor inlet $T^3$ of the device T. Throttling valves $M^5$ and $M^6$ in the pipes $T^2$ and P', respectively, form means by which the amounts of bath liquor passed by the pump P to the device T and to the pipe I may be regulated as desired. The device T and its association with the saturator A need not be further described as they form no part of the invention claimed herein and are fully disclosed and claimed in my prior application, Serial No. 473,949, filed January 29, 1943.

Fig. 1 also illustrates means including a settling tank L, for separating fine crystals from bath liquor overflowing from the feed tank J, and means including spray pipes W and WA for spraying water or other liquid washing agent into the gas space of the saturator to prevent or minimize rock salt deposits, and windows XA and XB in the saturator wall, through which rock salt deposits and other saturator operating characteristics may be visually observed. The features just referred to require only brief mention herein, however, as they form no part of the invention claimed in this application and are fully disclosed and are claimed in said prior application, Serial No. 473,949. By suitable adjustment of the valves M' and $M^2$, more or less of the liquor leaving the feed tank J through its overflow outlet J', may be diverted from the pipe $J^4$ into the tank L. The latter serves as a sedimentation chamber for the separation of clear liquor, which leaves the tank L through its outlet L', and crystals which settle into the tank L and are discharged from the bottom of the latter through a pipe $L^2$ including a valve $M^7$. The pipe $L^2$ is connected to the pipe $J^4$ at the outlet side of the valve $M^2$. The pipe L' leads to a storage tank Q, having a bottom outlet Q', which may be closed by a valve $M^8$ and through which the crystal free bath liquor may be discharged for such uses as the production of pyridine or the washing of sulphate deposits off the internal saturator wall, as is explained in said application, Serial No. 473,949.

The previously mentioned spray pipe W is in the form of a spray ring surrounding the upper end portion of the cracker pipe B, and is adapted to spray a liquid washing agent against the cracker pipe and against the adjacent inclined top wall of the saturator shell, to wash off sulphate deposits. The amount of liquid supplied to the pipe W may be regulated by a valve W'. The washing agent supplied to the pipe W may be supplemented by washing liquid supplied by a pipe WA which has its discharge end within the gas outlet E, and may also be supplemented in some cases by the injection of atomized water into the gas space of the saturator as is explained in said prior application, Serial No. 473,949.

The pivoted weir D' shown in Fig. 1 may be angularly adjusted to raise or lower the saturator overflow as required to obtain the desired scrubbing circulation and tar removal effects. The circulatory movement given the bath liquor at the top of the bath facilitates the removal to the tar separator O of tar eliminated from the gas bubbling through the bath. The relatively rapid removal of tar from the saturator of the tar is especially desirable because of the tendency of tar accumulating at the top of the bath to objectionably discolor the crystals formed, and because such tar accumulation tends to reduce the magnitude of the bath liquor circulation and to thereby make the scrubbing action less effective.

Figure 3:
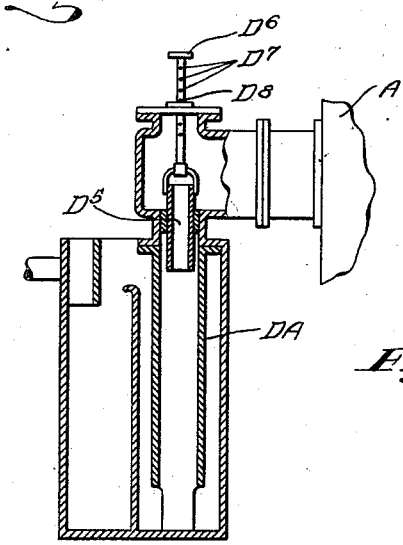
Fig. 3 is a sectional elevation illustrating a modified form of the bath level regulating means shown in Fig. 1.

The particular form of the means employed to regulate the overflow level in the saturator A, constitutes no part of the present invention, but it is noted that in lieu of the pivoted weir D' shown in Fig. 1, use may well be made of level regulating means of the form shown in Fig. 3, wherein a tubular element $D^5$ is telescopically mounted in the upper end of the vertical portion of the overflow conduit DA, so that the height of the upper end of the element $D^5$ is vertically adjusted by means of a stem $D^6$ extending through the top wall of the pipe DA and formed with a longitudinal series of transverse openings $D^7$ to receive a pin $D^8$ adapted to engage the top of the conduit DA and thereby fix the vertical position of the sleeve.

The inclusion in the saturator of either of the arrangements shown for regulating the overflow level makes it readily possible to periodically eliminate substantially all of the tar floating in the bath by first temporarily raising and then rapidly lowering the bath level, and thus maintain a high bath liquor overflow rate during the period in which the bath level is being rapidly lowered.

The portion of the saturator bath which in Fig. 1 is above the outlet $A^3$ and below the level of the lower end of the pipe I, may be conveniently referred to as the crystal outlet zone, and a primary object of the present invention is to maintain bath liquor conditions in said zone desirably restricting the movement to said outlet $A^3$ through said zone, of relatively small crystals, without correspondingly impeding the gravitational movement of larger crystals to the outlet $A^3$. The bath liquor return provisions illustrated in Fig. 1 are adapted to maintain such conditions.

If the rate at which bath liquor is returned through the pipe I exceeds the rate at which bath liquor is withdrawn through the outlet $A^3$, the bath liquor in the crystal outlet zone will consist practically entirely of liquor returned by the pipe I, and a portion of the liquor returned will flow upward away from said zone as indicated by the arrows in Fig. 1. In consequence there is then no flow of bath liquor into the crystal outlet zone from the portion of the bath above said zone. The last mentioned flow inevitably carries with it into the outlet $A^3$, fine crystals and crystals of intermediate size which remain wholly or largely in suspension in the bath liquor above the crystal outlet zone when no such flow occurs.

When bath liquor is returned through the pipe I at a rate lower than that at which bath liquor is withdrawn through the outlet $A^3$, there must be some flow to the outlet $A^3$ from the portion of the bath above the crystal outlet zone. However, so long as a substantial portion of the bath liquor withdrawn through the outlet $A^3$ is liquor which is returned through the pipe I and moves directly to said outlet from said pipe, the quantity of relatively small crystals passing out of the saturator through the outlet $A^3$ will be substantially smaller than it would be if there were no liquor return through the pipe I. The conjoint effect of the return of the treated liquor to the tank through the pipe I and of the discharge of gas jets through the spray pipe H, is to maintain a bath liquor, crystal separation zone in the lower portion of the conical bottom space of the tank which serves as a large crystal settling or collecting zone. In said zone, the fine crystal content is lower than the average fine crystal content of the bath liquor. With a rate of return of treated liquor to said collecting zone through the pipe I, which is suitably large, the liquor in said zone may consist substantially entirely, or in large part, of liquor returned to the saturator after being subjected to a crystal eliminating effect while out of the saturator. The gas discharged through the spray pipe H tends to maintain flow conditions in the large crystal collecting zone which offer greater opposition to the settling of fine crystals than to the settling of larger crystals in said zone, and which tend to return to the body of the bath fine crystals passing therefrom into said zone.

The bath liquor, if returned at a rate which significantly exceeds the rate at which carrying stream liquor is withdrawn from the zone, also tends to maintain desirable flow conditions in the settling zone.

When all of the liquor overflowing from the feed tank J is returned to the saturator through the pipe I, the volume of liquor thus returned is great enough to avoid significant fine crystal movement to the outlet $A^3$ from the portion of the bath above the crystal outlet zone. There is a special advantage in having all or at least the major portion of the liquor returned through the pipe I, supplied by the feed tank overflow outlet $J'$, since in such case any disturbance or interruption in the operation of the pump F will similarly modify the rates at which liquor is withdrawn through the outlet $A^3$ and returned through the pipe I. In consequence, the effect of a temporary interruption in the operation of the pump F on the liquor conditions in the crystal outlet zone will be minimized.

Whether the bath liquor returned through the pipe I comes wholly from the overflow outlet $J'$ of the feed tank J, or wholly through the pump P and tar separator O, or comes partly from one and partly from the other of said sources, the crystal content of the return liquor is relatively small and consists mainly of fine crystals as has been explained above. The small crystal content of the bath liquor returned by the pipe I and the fact that said content consists mainly of fine crystals, is advantageous since it reduces the fine crystal content of the liquor passed by the pump F from the outlet $A^3$ to the feed tank J, and a reduction in the fine crystal content of the liquor passed into said tank reduces the fine crystal content of the crystal and liquor mixture passed to the centrifuge K and thus increases the average size of the crystals passing to storage through the centrifuge outlet $K^2$.

Desirable crystal outlet zone conditions may be maintained in various ways. Thus, for example, the bath liquor in the carrying stream passing from the outlet $A^3$ through the pipe $F^1$ may be bath liquor returned from the feed tank J and/or the tar separator O to the outlet pipe connection, as shown in Fig. 2, without passing through any portion of the saturator.

Figure 2:
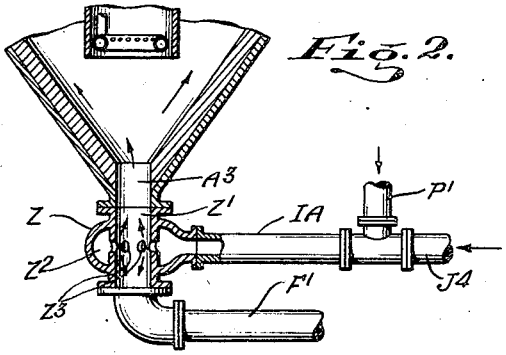
Fig. 2 is a sectional elevation illustrating a modification of a portion of the apparatus shown in Fig. 1.

In the arrangement illustrated in Fig. 2, a pipe fitting Z is interposed between the lower end of such a saturator crystal outlet $A^3$ as is shown in Fig. 1, and the inlet pipe $F''$ of the pump F. The fitting Z is formed with a central vertical passageway $Z'$ below and in register with the outlet passage $A^3$ and into which suitably heavy sulphate crystals may gravitate from the lower portion of the saturator. The fitting Z is also formed with an annular chamber $Z^2$ surrounding the central passage $Z'$ and in communication with the passage $Z'$ through a circular series of small ports $Z^3$. The chamber $Z^2$ receives bath liquor through a pipe IA from either or both of the pipes $P'$ and $J^4$. The pipes $P'$ and $J^4$ of Fig. 2 may be connected to and receive bath liquor from the tar separator and the feed tank J, respectively, as in the arrangement shown in Fig. 1.

As will be apparent, the liquor with its relatively small crystal content which enters the passage $Z'$ from the chamber $Z^2$, is adapted to maintain a crystal outlet zone which will minimize the movement of small crystals from the saturator into the pipe $F''$, generally as such movement is minimized in Fig. 1. In Fig. 2, however, the crystal outlet zone includes the passage $Z'$ and will not extend into the saturator unless the rate of outflow through the pipe F' is less than the rate of inflow into the passage Z' from the chamber Z² so that some of the returned bath liquor will pass into the saturator through the outlet A³ as is indicated by the arrows in Fig. 2. Regardless of the extent and disposition of the crystal outlet zone in Fig. 2, however, it serves the main purpose of the crystal outlet zone of Fig. 1, in that it minimizes the amount of fine and relatively small fine crystals away from the saturator through the pipe F', by preventing or reducing flow of saturator bath flow which tends to move suspended crystals into the outlet A³ and by supplying carrying stream liquor which has a small crystal content lower than that of the bath liquor in the saturator.

Figure 4:
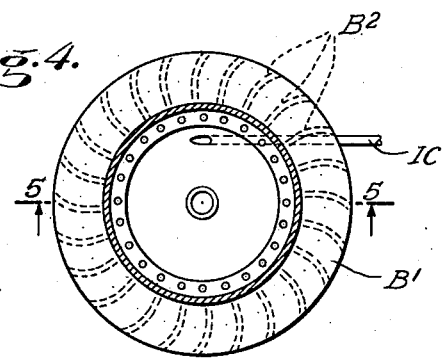
Fig. 4 is a partial plan section of a saturator embodying another modification of the saturator shown in Fig. 1.
Figure 5:
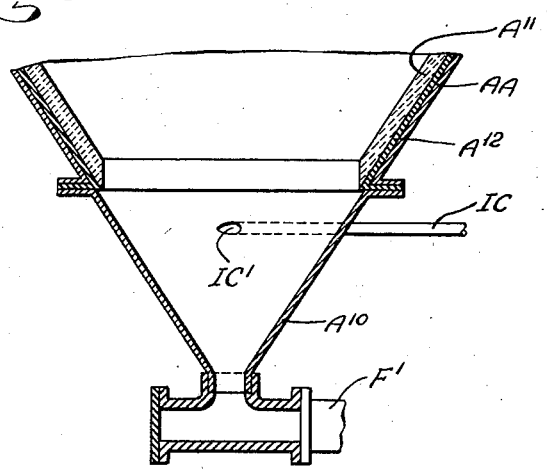
Fig. 5 is a sectional elevation of the lower portion of the saturator shown in Fig. 4.

In the arrangement shown in Figs. 4 and 5, bath liquor is returned to the crystal outlet zone of the saturator through a pipe IC to which bath liquor may be supplied as it is supplied to the previously described pipes I, IA and IB. The discharge end of the pipe IC is horizontal and opens tangentially at IC' into the conical hopper bottom portion of a saturator AA. Liquor returned by the pipe IC moves spirally from its discharge end IC' to the subjacent crystal outlet A³, and tends to keep the conical wall surrounding the crystal outlet zone free from rock salt deposits.

As shown in Fig. 5, the lower end of the hopper bottom portion of the saturator AA is formed by a metal part A¹⁰ separable from the steel outer shell of the portion of the separator AA above said part. The part A¹⁰ is advantageously formed by Monel metal or other metal not subject to attack by the bath liquor, and is formed with a smooth inner surface to which rock salt has less tendency to adhere than it does to adhere to the bricks which customarily form the inner lining A' for the steel shell of a saturator, and constitutes a protective cover for the outer leadlining A¹² interposed between the shell AA and brick layer A¹⁰. The tendency to rock salt deposits on the submerged saturated wall surface due to the low acidity of the bath employed in the production of large sulphate crystals, is augmented by the fact that the crystal removal means are operated to maintain a large volume of crystals in suspension in the bath liquor. In practice the volume of the crystals suspended in the bath liquor is normally somewhat in excess of 5% of the bath volume. Under such conditions the tendency of rock salt to adhere to the brick lining of a saturator may advantageously be minimized by forming said lining of bricks which have their exposed faces enameled or glazed.

With all of the forms of apparatus described for maintaining a crystal outlet zone consisting wholly or substantially of bath liquor having a small fine crystal content, it is possible by reducing the return of bath liquor to said zone and by increasing the bath acidity, to decrease the size of the crystals produced. When the flow of bath liquor through the pipes I, IA, IB and IC is interrupted, it is thus possible to operate the saturators to which said pipes pertain as required for the production of the small crystal sulphate, heretofore commonly produced in this country, as market conditions may sometimes make desirable. This application is a continuation in part of my earlier application, Serial No. 473,950, filed January 29, 1943.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In the production of ammonium sulphate crystals by passing distillation gas from coke-oven plants containing ammonia into contact with sulphuric acid bath liquor in a saturator having a relatively quiescent crystal receiving space at its lower end opening upwardly into the crystal forming and bath space above it and having a horizontal cross section substantially smaller than the average horizontal section of the second mentioned space, the method which comprises the combination of agitating the upper crystal forming space to bring the crystals up to the upper supersaturated liquor layers of the bath, of withdrawing bath liquor containing crystals by a pump from the lower receiving space, of removing crystals from the bath liquor so withdrawn, and of returning the bath liquor from which the crystals have been withdrawn at a level below the agitated upper crystal forming space to the point of withdrawal of bath liquor from the lower receiving space by said pump.

2. Apparatus for producing sulphate of ammonia by scrubbing contact of distillation gas with sulphuric acid liquid comprising in combination a saturator shell adapted to contain a bath of sulphuric acid in the lower portion thereof, and having a conical bottom portion and a bottom outlet and a horizontally disposed tangential inlet opening into said conical bottom portion above said bottom outlet and a withdrawal pipe constructed and located so as to establish an intermediate level of liquid in said shell above said conical bottom portion, a vertically disposed pipe extending downwardly into said shell and having a flared mouth below said intermediate level, inlet means for gases into said pipe and conduit means external to said shell and communicating with said tangential inlet and adapted to pass bath liquor into said shell through said inlet, whereby the passage of bath liquor into said shell through said inlet at a rate exceeding the rate of outflow through said bottom outlet will maintain a circularly directed flow of liquor in said conical bottom portion at the level of said inlet and a flow of liquor directed upwardly from said level.

3. In the production of sulphate of ammonia crystals in a saturator tank having a conical bottom portion and an overflow outlet at an intermediate level above said conical bottom portion and in which a bath of sulphuric acid is maintained below said level and a gas space above said bath, the method which comprises passing ammonia containing gas through said saturator and into scrubbing contact with the bath liquor therein and thence through said gas space, withdrawing a mixture of crystals and bath liquor from said tank at the lower end of its conical bottom portion, withdrawing bath liquor from the tank through said overflow outlet and passing bath liquor into said tank in a horizontally directed stream tangential to the inner wall of said conical bottom portion of the shell at a level adjacent but above the level at which crystals admixed with bath liquor are withdrawn from the shell and at a volumetric rate exceeding the volumetric rate at which the mixture of crystals and bath liquor is withdrawn to thereby create a circularly and upwardly directed flow of bath liquor at the second mentioned level forming a barrier or baffle which materially minimizes the gravitational downflow of fine crystals through said second level without similarly minimizing opposition to the downflow of larger crystals.

CARL OTTO.

REFERENCES CITED

The following references are of record in the file of this patent:

UNITED STATES PATENTS

| Number | Name | Date |
|---|---|---|
| 2,037,595 | Schaefer | Apr. 14, 1936 |
| 2,318,463 | Bussman | May 4, 1943 |
| 1,932,674 | Pyzel | Oct. 31, 1933 |
| 1,845,742 | Cocksedge | Feb. 16, 1932 |
| 1,693,786 | Isaacksen | Dec. 4, 1928 |
| 1,972,730 | Connell | Sept. 4, 1934 |
| 2,232,115 | Koppers | Feb. 18, 1941 |
| 1,559,703 | Howard | Nov. 3, 1925 |
| 1,936,308 | Mueller | Nov. 21, 1933 |
| 2,137,729 | Schnellenburg | Nov. 22, 1938 |

FOREIGN PATENTS

| Number | Country | Date |
|---|---|---|
| 507,351 | Great Britain | June 14, 1931 |
| 669,864 | Germany | Jan. 5, 1939 |
| 655,465 | Germany | Jan. 15, 1938 |